Sept. 3, 1963　　　E. F. PETERMEIER　　　3,102,625
BALE LOADING APPARATUS
Filed Feb. 16, 1962　　　2 Sheets-Sheet 1
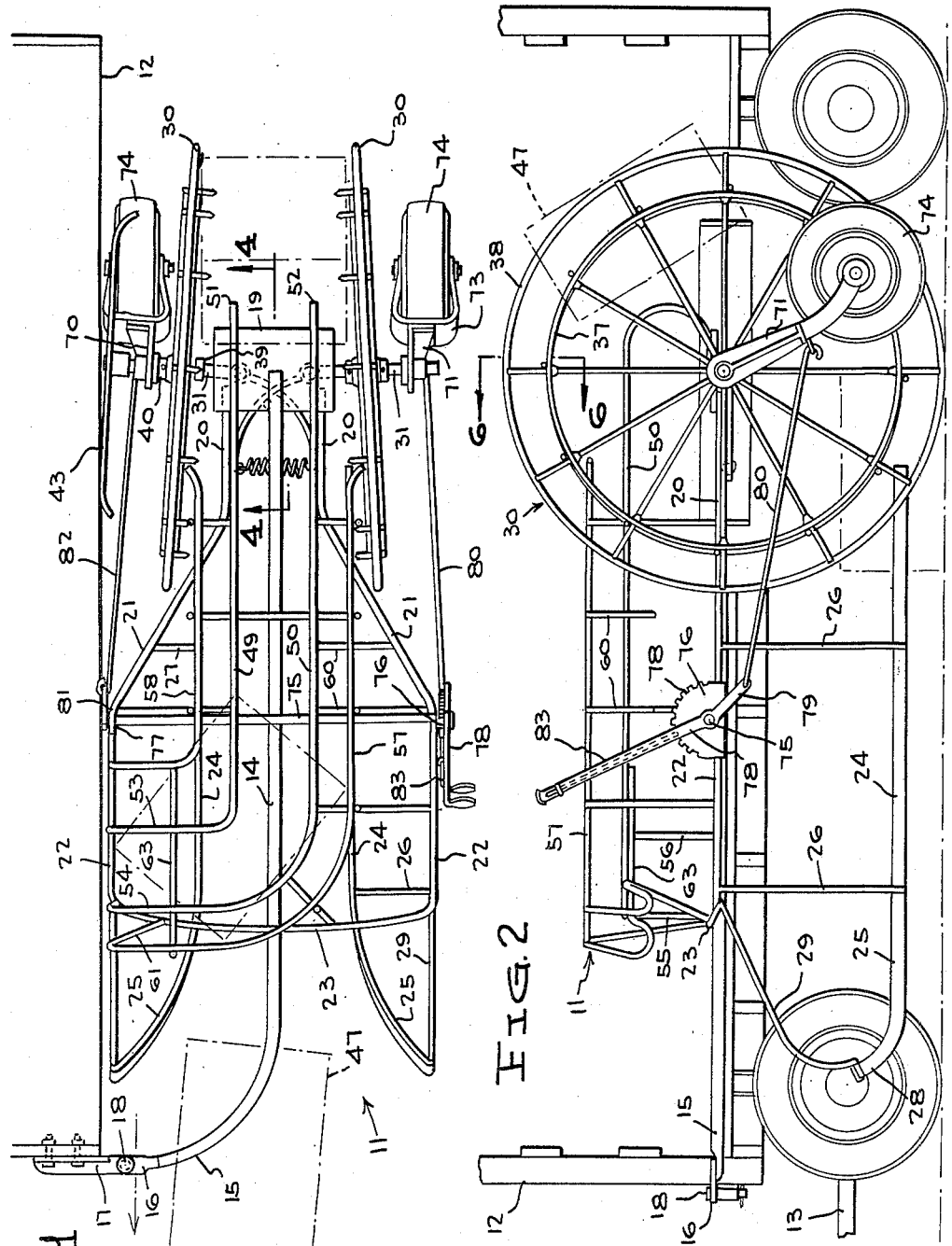
INVENTOR.
EDWIN F. PETERMEIER
BY
McMorrow, Berman & Davidson
ATTORNEYS Sept. 3, 1963     E. F. PETERMEIER     3,102,625
BALE LOADING APPARATUS
Filed Feb. 16, 1962     2 Sheets-Sheet 2
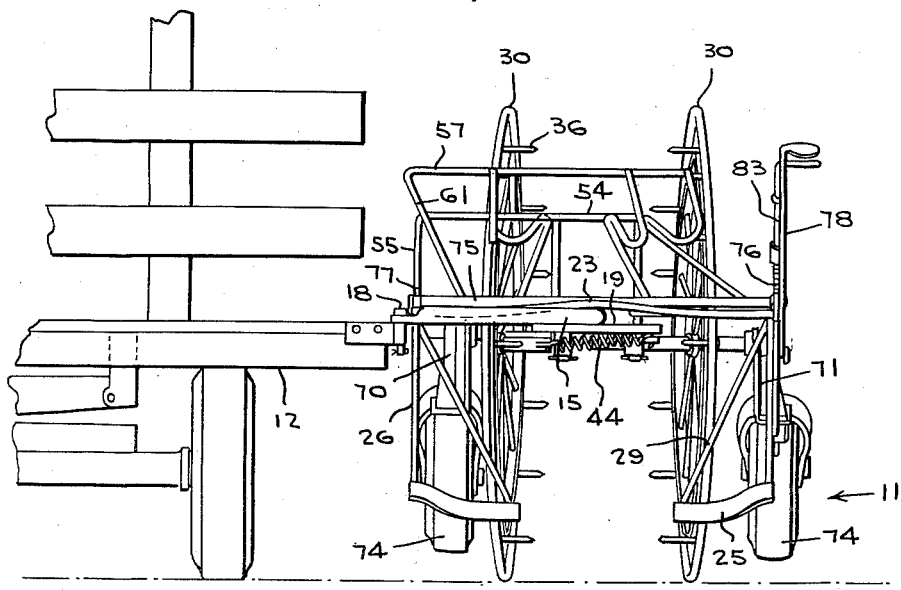
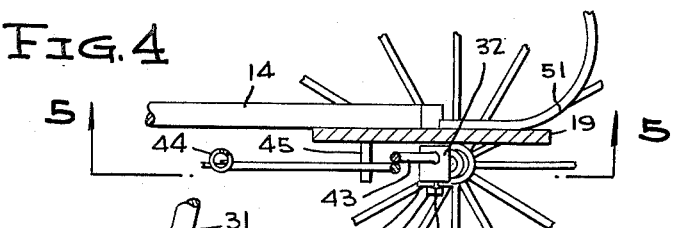
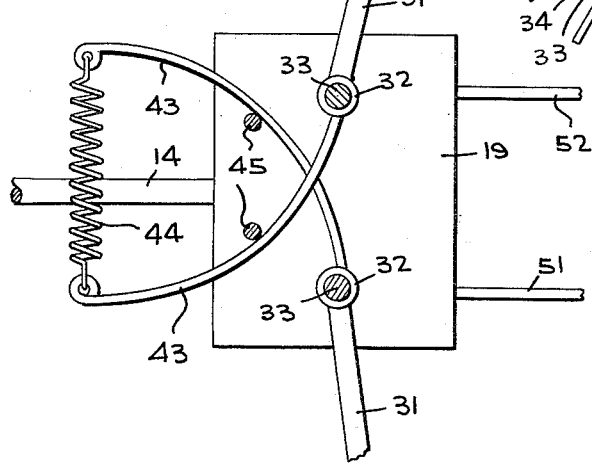
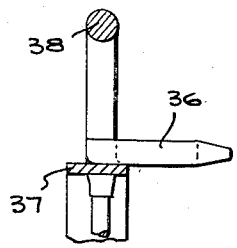
INVENTOR.
EDWIN F. PETERMEIER
BY
McMorrow, Berman & Davidson
ATTORNEYS

United States Patent Office 3,102,625
Patented Sept. 3, 1963

3,102,625
BALE LOADING APPARATUS
Edwin F. Petermeier, Rte. 2, Box 225, Melrose, Minn.
Filed Feb. 16, 1962, Ser. No. 173,674
5 Claims. (Cl. 198—7)

This invention relates to a loading machine, and more particularly to a loading attachment for a vehicle, such as a truck, or the like, for loading bales of hay or similar material onto a truck.

The main object of the invention is to provide a novel and improved loading machine which is relatively simple in construction, which is adapted to handle bales on various types of terrain and to lift the bales off the ground and load them onto the associated truck without damage to the bales, and being adapted to handle bales which are either loosely or tightly tied.

A further object of the invention is to provide an improved bale loading attachment for a truck, said attachment being inexpensive to fabricate, being durable in construction, being easy to operate, being safe to use, and being operable with a wide range of sizes and shapes of bales.

A still further object of the invention is to provide an improved bale loading attachment for a truck which is adapted to operate at relatively high speed, which is relatively compact in size, and which is provided with means for adapting same for road travel when not in use.

Further objects and advantages of the invention will become apparent from the following description and claims, and from the accompanying drawings, wherein:

FIGURE 1 is a top plan view of an improved bale loading machine according to the present invention, shown attached to a truck in operating position.

FIGURE 2 is a side elevational view of the bale loading machine of FIGURE 1.

FIGURE 3 is a front elevational view of the bale loading machine of FIGURES 1 and 2.

FIGURE 4 is an enlarged vertical cross sectional detail view taken substantially on the line 4—4 of FIGURE 1.

FIGURE 5 is a horizontal cross sectional view taken substantially on the line 5—5 of FIGURE 4.

FIGURE 6 is an enlarged cross sectional detail view taken substantially on the line 6—6 of FIGURE 2.

Referring to the drawings, 11 generally designates an improved bale loading machine according to the present invention. The bale loading machine is adapted to be connected to and moved with a conventional truck 12 on which the bales are to be loaded, the truck 12 being connected to a suitable hauling vehicle, such as a tractor, or the like, by means of a suitable hitch bar 13 provided on the forward end of the truck.

The loading machine 11 comprises a main draw bar 14 whose major portion extends longitudinally, as shown in FIGURE 1, and which is provided at its forward end with an arcuately curved portion 15 terminating in an apertured, transversely extending hitch lug 16 which is adapted to be connected to an outwardly directed transverse bracket member 17 secured to the front end of the truck 12, for example, by a vertical hitch pin 18, as shown in FIGURES 1 and 2.

Rigidly secured to the rear end of the main draw bar 14 is a horizontal, transversely extending rectangular plate member 19, and symmetrically secured to the under side of said plate member adjacent its opposite end portions and extending parallel to the main draw bar 14 are respective tubular frame bars 20, 20. Said frame bars are provided with the forwardly flaring forward end portions 21, 21 which integrally merge with longitudinal frame bar portions 22, 22, said frame bar portions being integrally connected at their forward ends by an arcuately curved, transversely extending cross bar portion 23.

Designated at 24, 24 are respective longitudinally extending lower frame members which are provided at their forward ends with the forwardly flaring portions 25, 25, the members 24, 24 defining two runners which are rigidly secured to and supported from the members 22 and 21 by downwardly and inwardly inclined fastening bars 26, the rear portions of the runners being similarly rigidly supported by and secured to the member 21 by fastening rods 27. The forward ends of the forwardly flaring portions 25, 25 of the runners curve upwardly, as shown at 28, and are secured to the forward ends of the frame bar portions 22 by arcuately curved tubular connecting rods 29.

As shown in FIGURES 1 and 2, the frame members 24 and 25 are normally supported above ground level and substantially parallel thereto.

Designated at 30, 30 are respective relatively large radially spoked wheels which are respectively journaled on outwardly extending shaft members 31, 31 integrally formed at their forward ends with vertical sleeves 32 which are rotatably engaged on vertical pivot pins 33, 33 depending from and rigidly secured to the plate member 19. As shown in FIGURE 4, retaining washers 34 are provided on the lower portions of the pivot shafts, being held subjacent the sleeve members 32 by suitable retaining means, such as cotter pins 35 engaged through the lower portions of the pivot shafts 33.

The wheels 30, 30 are of substantial size and are of sufficient diameter to support the rear portion of the main frame of the machine 11 in a substantially horizontal position. The wheels 30 are provided adjacent their peripheries with the inwardly projecting prongs 36, said prongs being secured on rings 37 provided on the inner portions of the wheels, said rings being somewhat smaller in diameter than the outer rings 38 of said wheels, as shown in FIGURE 2, so that the prongs 36 are spaced short distances inwardly from the outer rings 38. The wheels 30 are journaled on the axles 31 for free rotation thereon, and are retained against endwise movement on the axles by the provision of retaining collars 39 and 40 secured on the axles 31 on opposite sides of the hubs of the wheels 30, as shown in FIGURE 1. Secured on the end of the axle 31 adjacent the truck 12 is a longitudinally extending bumper bar 42 which serves as a means to prevent the wheels 30, 30 from swinging inwardly toward the truck 12 beyond a predetermined limiting position, namely, a position wherein the bumper member 42 engages the side edge of the bed of truck 12.

As shown in FIGURE 5, respective arcuately curved inner arms 43, 43 are provided on the sleeve members 32, said arms 43 extending inwardly and overlying each other, the inner ends of the arms being connected by a coil spring 44 so as to resiliently bias the inner end portions of the arms 43, 43 towards each other. Inward rotation of the arms 43 is limited by the provision of a pair of upstanding vertical stop pins 45, 45 secured on the plate member 19 and limiting the inward rotation of the arms 43 to positions substantially as illustrated in FIGURE 5, namely, to positions wherein the axle elements 31, 31 are inclined by small angles in a rearward direction with respect to a transverse plane containing the axes of the shafts 33, 33. Thus, in the innermost positions of the arms 43, 43, the wheels 30, 30 converge rearwardly, but the rear portions of the wheels are yieldable outwardly because of the yieldability of the coil spring 44 which connects the forward ends of the arms 43, 43. The spacing between the forward portions of the wheels 30, 30 is somewhat greater than the transverse width of the bales of hay, or similar material, shown at 47, which are to be elevated, so that the bales will readily pass between the wheels as the machine is moved forwardly, being thereafter grippingly engageable by the prongs 36 as the wheels rotate, and being eventually gripped between the rear portions of the wheels.

A pair of longitudinally extending supporting rails 49 and 50 are provided on the frame of the machine, said supporting rails having the arcuately curved rear end portions 51 and 52 which are rigidly secured at their bottom ends to the plate member 19. The bale supporting rails 49 and 50 are parallel to each other over the major portion of the frame of the machine, and are provided at their forward ends wtih the laterally extending, parallel transverse terminal portions 53 and 54 which terminate adjacent the side edge of the truck 12, as shown in FIGURE 1, and which are formed with the depending supporting portions 55 and 56 rigidly secured to the frame member 22. Respective guide rails 57 and 58 are provided on the machine, said guide rails being located above and spaced laterally from the supporting rails 49 and 50, said guide rails being rigidly secured to said supporting rails, for example, by the curved, outwardly convex connecting loops 60. Thus, the upper guide rail 57 is spaced above and outwardly from the bale supporting rail 50, being connected thereto by the loops 60, and being connected at its forward end to the transversely extending member 23 by the terminal portion 61 of the rail 57. Similarly, the guide rail 58 is spaced upwardly and inwardly with respect to the bale supporting rail 49, substantially following the contour of the rail 49 and its forward portion 53, as shown in FIGURE 1, the forward portions of the members 57, 54, 53 and 58 being rigidly connected together by a tubular cross rod 63.

It will be seen that the members 58, 49, 50, and 57 define a guide chute adapted to support a bale and to allow the bale to be slid forwardly, the chute merging with the transversely extending front portion thereof defined by the members 53 and 54 and the laterally curved front end portions of members 58 and 57, the chute leading laterally to the receiving truck 12.

As shown in FIGURE 2, the rear end portion of the receiving chute defined by the members 58, 49, 50 and 57 comprises the arcuately curved end portions 51 and 52 of the members 49 and 50, these arcuately curved portions being parallel to each other and being spaced apart by the proper distance to receive a bale 47 thereon when the bale is elevated by the rear portions of the convergent wheels 30, 30 as the wheels rotate with forward movement of the machine in the manner illustrated in FIGURE 2. Thus, when the truck 12 is moved forwardly, the wheels rotate in a counterclockwise direction, as viewed in FIGURE 2, and bales 47 are received between the widely spaced forward portions of the wheels, being thereafter engaged by the prongs 36 and gripped by the more closely spaced rear portions of the wheels, the bales being elevated by the rotation of the wheels until the bales are raised above the rear portions of the supporting rails 49 and 50, being finally deposited thereon as the wheels continue to rotate by the increased spacing between the portions of the wheels gripping the bales therebetween. Thus, as the forward portions of the wheels separate, the bales are released and are deposited on the supporting rails 49 and 50, whereupon the operator may push the bales forwardly onto supporting rails through the chute defined by members 58, 49, 50 and 57, and finally may push the bales laterally over the portions 53 and 54 onto the side of the truck 12.

As will be apparent from FIGURE 1, as the truck 12 moves forwardly, the bales 47 are received between the forwardly divergent elements 25, 25 of the guide shoes 24, 24, the bales being thus guided between the longitudinally extending spaced parallel shoe members 24, 24 to be ultimately disposed between the rearwardly convergent lifting wheels 30, 30 with continued forward movement of truck 12. Since the wheels 30, 30 engage the ground, they are rotated responsive to the forward movement of truck 12, so that the bales are gripped therebetween and elevated onto the rails 49 and 50 in the manner above described.

It will be noted that since the machine is pivotally attached to the bracket 17 by the vertical pivot pin 18, the machine is free to deviate somewhat from its course relative to the direction of movement of the truck 12, so that bales which are of different distances from the path of movement of the truck 12 may be accepted by the machine and may be handled thereby with substantially equal facility.

Respective arms 70 and 71 are rotatably mounted on axles 31, 31, outwardly of the wheels 30, 30, each of the arms being provided with a wheel-supporting yoke 73 in which is journaled the supporting wheel 74. A transverse shaft 75 is rotatably mounted on the machine frame at its forward portion, said shaft being rotatably supported in upstanding bracket elements 76 and 77 respectively provided on the members 22, 22. The bracket element 76 comprises a vertical plate formed at its top edge with the semicircular rack gear configuration 78, and secured on the shaft 75 is a lever 78 formed with a depending arm 79 which is connected to arm 71 by a link rod 80. A depending arm 81 is rigidly secured to the opposite end of shaft 75, said arm 81 being connected to the arm 70 by a link rod 82. Lever 78 is provided with a conventional locking dog 83 which is engageable with the teeth of the semicircular rack element 78 to lock the shaft 75 in a position wherein the wheels 74 are held above the ground, allowing the machine to be used in its normal manner, as above described, namely, as a loading attachment for the truck 12. However, when it is desired to transport the machine independently, namely, without rotation of the loading wheels 30, 30, the locking dog 83 is retracted to release the lever 78, and to allow the wheels 74 to be lowered, after which the locking dog may be again employed to lock the lever 78 to hold the wheels 74 in positions below the loading wheels 30, 30, whereby the rear portion of the frame is supported on the wheels 74, 74 and the frame may be moved without rotating the loading wheels 30, 30. Thus, with the wheels 74, 74 lowered, as above described, the forward end of the machine may be attached to a suitable hauling vehicle, such as a tractor or the like, so that it may be transported in a non-operating condition to any desired destination.

It will be noted that in operation, the bales are received between the yieldable convergent rear portions of the wheels 30, 30 and are clampingly engaged thereby, the prongs 36 penetrating the bales to hold them between the rear clamping portions of the wheels and to prevent them from dropping as they are elevated by the wheels onto the guideway of the machine. The spring 44 is of sufficient strength to firmly grip the bales, but is yieldable sufficiently to prevent the bales from being excessively compressed and to prevent damage to the bales. It will be noted that the bales are picked up off the ground by the wheels without causing the bales to be dragged along the ground, whereby damage to the bales is minimized. It will be further apparent that the machine is effective to handle bales of different degrees of tightness with equal effectiveness, since the machine does not depend upon the tightness or density of the bales.

It will also be apparent that the machine is effective to pick up bales which are not accurately aligned longitudinally with the machine, since the machine is free to pivot around the vertical pivot pin 18 as it engages a bale, and also because the bales will be automatically oriented in the proper direction to be clampingly received between the pronged lifting wheels 30, 30 by the time the wheels reach the blaes for engagement therewith.

While a specific embodiment of an improved loading machine for bales of hay and similar material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bale loader comprising a frame adapted to be connected to a vehicle and including a longitudinal guideway having a laterally extending portion for slidably supporting bales and guiding the bales laterally off the frame, a pair of outwardly extending axles pivoted to opposite side portions of the frame for rotation on substantially vertical axes, means biasing said axles rearwardly, and respective totally rigid inwardly pronged bale-engaging wheels journaled on said axles on opposite sides of said guideway and normally converging rearwardly, said wheels being adapted to support said frame and to be rotated responsive to forward movement of the associated vehicle, whereby to clampingly and resiliently engage bales therebetween and elevate the bales onto said guideway.

2. A bale loader comprising a frame adapted to be connected to a vehicle and including a longitudinal guideway having a laterally extending portion for slidably supporting bales thereon and guiding the bales laterally off the frame, a pair of outwardly extending axles pivoted to opposite side portions of the frame for rotation on substantially vertical axes, respective inwardly extending arms secured to said axles, spring means connecting said arms and biasing said axles rearwardly, and respective totally rigid inwardly pronged bale-engaging wheels journaled on said axles on opposite sides of said guideway and normally converging rearwardly, said wheels being adapted to support said frame and to be rotated responsive to forward movement of the associated vehicle, whereby to clampingly and resiliently engage bales therebetween and elevate the blades onto said guideway.

3. A bale loader comprising a frame adapted to be connected to a vehicle and including a longitudinal guideway having a laterally extending portion for slidably supporting bales thereon and guiding the bales laterally off the frame, a pair of outwardly extending axles pivoted to opposite side portions of the frame for rotation on substantially vertical axes, respective inwardly extending arms secured to said axles, spring means connecting said arms and biasing said axles rearwardly, respective totally rigid bale-engaging wheels journaled on said axles on opposite sides of said guideway and normally converging rearwardly, said wheels being adapted to support said frame and to be rotated responsive to forward movement of the associated vehicle, and inwardly projecting rigid prongs on the wheels adjacent their peripheries adapted to engage with bales resiliently and clampingly received between the wheels and elevate the bales onto said guideway.

4. A bale loader comprising a frame adapted to be connected to a vehicle and including a longitudinal guideway having a laterally extending portion for slidably supporting bales thereon and guiding the bales laterally off the frame, a pair of outwardly extending axles pivoted to opposite side portions of the frame for rotation on substantially vertical axes, respective inwardly extending arms secured to said axles, spring means connecting said arms and biasing said axles rearwardly, stop means on the frame engageable by said arms and limiting rearward rotation of said axles, respective totally rigid bale-engaging wheels journaled on said axles on opposite sides of said guideway and normally converging rearwardly, said wheels being adapted to support said frame and to be rotated responsive to forward movement of the associated vehicle, and inwardly projecting rigid prongs on the wheels adjacent their peripheries adapted to engage with bales resiliently and clampingly received between the wheels and elevate the bales onto said guideway.

5. A bale loader comprising a frame adapted to be connected to a vehicle and including a longitudinal guideway having a laterally extending portion for slidably supporting bales thereon and guiding the bales laterally off the frame, a pair of outwardly extending axles pivoted to opposite side portions of the frame for rotation on substantially vertical axes, respective inwardly extending arms secured to said axles, spring means connecting said arms and biasing said axles rearwardly, stop means on the frame engageable by said arms and limiting rearward rotation of said axles, respective totally rigid bale-engaging wheels journaled on said axles on opposite sides of said guideway and normally converging rearwardly, said wheels being adapted to support said frame and to be rotated responsive to forward movement of the associated vehicle, inwardly projecting rigid prongs on the wheels adjacent their peripheries adapted to engage with bales resiliently and clampingly received between the wheels and elevate the bales onto said guideway, respective supporting wheel assemblies journaled on said axles and provided with ground-engaging wheels, and means to at times swing said assemblies downwardly to positions wherein said frame is supported on said last-named wheels with the bale-engaging wheels elevated from the ground.

References Cited in the file of this patent

UNITED STATES PATENTS

| 1,099,540 | Douglass | June 9, 1914 |
| 2,767,822 | Hodgson | Oct. 23, 1956 |

FOREIGN PATENTS

| 623,455 | Canada | July 11, 1961 |